E. BENSON.
COMBINATION CALIPERS AND POISING TOOL.
APPLICATION FILED OCT. 30, 1908.
959,699.
Patented May 31, 1910.
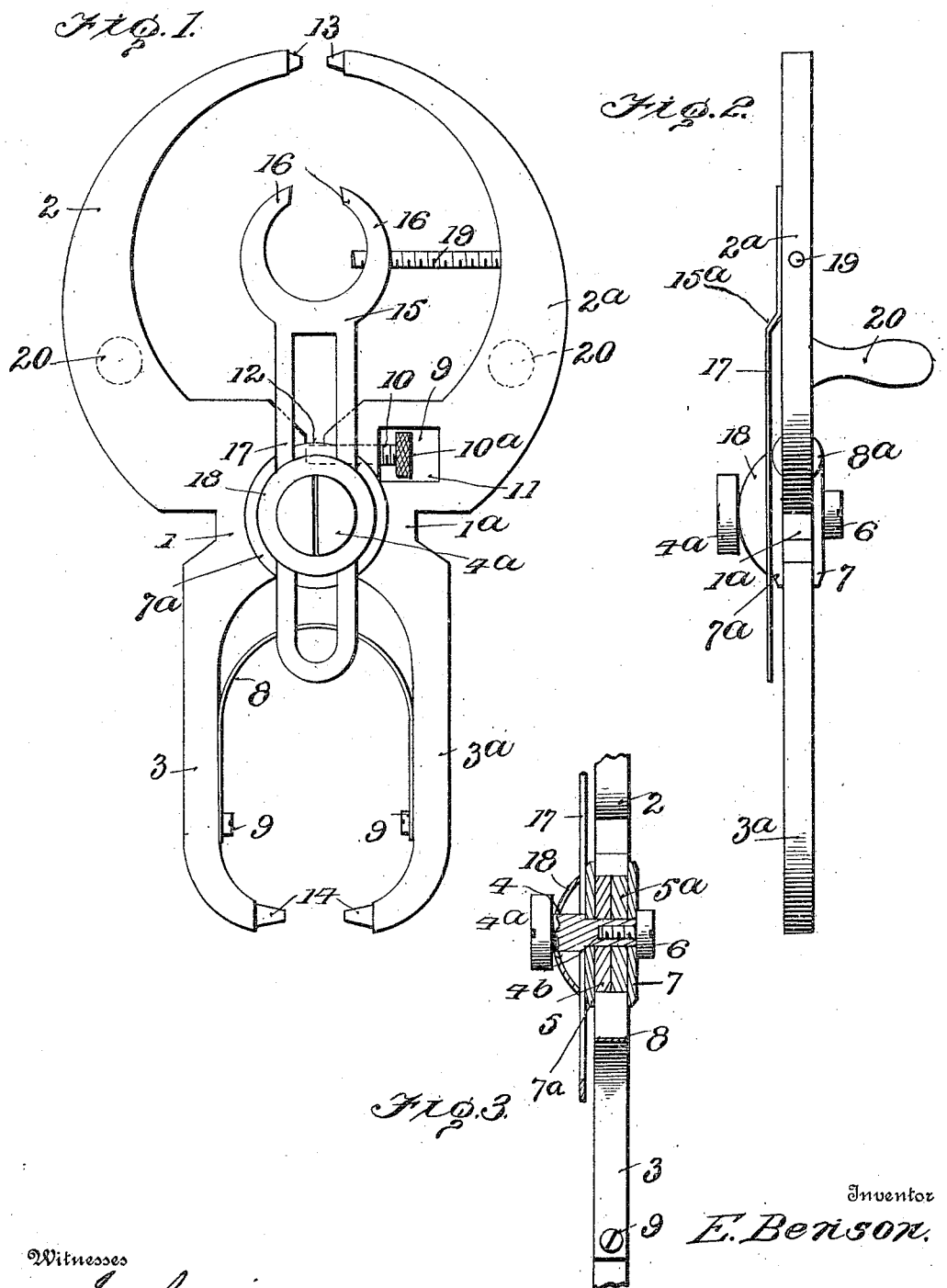
Witnesses
Inventor
E. Benson.
By
Lacey, Attorneys

UNITED STATES PATENT OFFICE.

ELOF BENSON, OF YOUNGSTOWN, OHIO.

COMBINATION CALIPERS AND POISING-TOOL.

959,699. Specification of Letters Patent. Patented May 31, 1910.

Application filed October 30, 1908. Serial No. 460,259.

*To all whom it may concern:*

Be it known that I, ELOF BENSON, citizen of the United States, residing at Youngstown, in the county of Mahoning and State of Ohio, have invented certain new and useful Improvements in Combination Calipers and Poising-Tools, of which the following is a specification.

The object of my invention is to provide an efficient, simple and inexpensive caliper particularly adapted for use of watchmakers and designed as a truing and poising tool whereby the truing or poising of a balance wheel, or other wheels of a watch or clock, may be accurately accomplished.

In the use of ordinary watchmakers' calipers great care must be exercised by the operator when adjusting the delicately constructed pivots of a wheel to the bearings carried by the caliper jaws, and if not properly manipulated, the pivots may be irreparably injured. With the elimination of this defect in view the present invention contemplates the construction and arrangement of caliper arms or jaws pivoted intermediate of their ends and provided with jewel bearings adapted to offer the least possible resistance to the wheel pivots when adjusted to the jaws. A truing bar adjustably secured to the caliper arms is designed to register the slightest deviation or defect in the wheel as regards trueness and means for giving vibration to the jaws, whereby any imperfection in the poise of the wheel may be determined.

For a full understanding of the invention and the merits thereof and also to acquire a knowledge of the details of construction and the means for effecting the result, reference is to be had to the following description and accompanying drawings, in which:—

Figure 1 is a front elevation of my improved caliper; Fig. 2 is an edge elevation thereof; and, Fig. 3 is an edge elevation partly in section, illustrating the pivotal point of the several parts.

Corresponding and like parts are referred to in the following description and indicated in all the views of the drawings by the same reference characters.

Referring to the drawings, the numerals 1 and $1^a$ designate two like arms provided at corresponding extremities with jaws 2 and $2^a$ comprising oppositely curved portions, and at their opposite extremities with jaws 3 and $3^a$ of substantially straight formation. These arms are preferably constructed of metal and pivoted to each other intermediate their ends by a pivot pin 4 extending through registering openings in the oppositely formed transversely reduced portions 5 and $5^a$, and when assembled, the reduced portions which are circular, overlap (Fig. 3,) and permit relative movement of the arms to open or close the jaws as desired. The pin 4 is provided with a head $4^a$ at one extremity and is formed with a threaded longitudinal opening at its opposite extremity designed for the reception of an auxiliary screw 6.

Located on both sides of the arms at their pivotal point are plates 7 and $7^a$ provided with openings registering with the pivot openings in said reduced portions 5 and $5^a$ for the passage of the pin 4, and an annular shoulder $4^b$ formed upon said pin and resting upon the outer face of the plate $7^a$ is designed to coöperate with the screw 6 to hold said plates and the reduced portion of the arms in their proper relative position.

The numeral 8 designates a spring interposed between the jaws 3 and $3^a$ and secured thereto as indicated at 9 and arranged to spread said jaws apart and the jaws 2 and $2^a$ together. A stop screw 10 carried by the arm $1^a$ and operating in a threaded transverse opening in said arm is designed to counteract the tension of the spring 8 upon the jaws 3 and $3^a$ and to hold the jaws at the proper distance while the spring holds the jaws 2 and $2^a$ as close together as the screw will admit. The head $10^a$ forms a thumb piece by which the screw is manipulated, and is permitted to move transversely of the arm $1^a$ in the opening 11 formed in said arm, and the opposite end of said screw operates against the inner face of the shank portion of the arm 1 as indicated at 12.

Secured to the extremities of the jaws 2 and $2^a$ and 3 and $3^a$ are jewel bearings 13 and 14 respectively designed to receive the wheel pivots (not shown) and offer the least possible resistance to the movement of the wheel when suspended between the arms. The jaws 3 and $3^a$, and jewel bearings 14 are particularly adapted for use in connection with the heavier and larger wheels of a watch or clock while the jaws 2 and $2^a$ with jewel bearings 13 are especially designed for the examination of the more delicately constructed wheels of a watch as for instance, a balance wheel.

The numeral 15 designates a truing or indicator bar provided at one extremity with guide points 16 of the same general formation as the caliper jaws 2 and 2ª, and a slotted shank portion 17 integrally a part of said guide points and through which the pin 4 extends, is adjustably secured to the caliper at one side by a hemispherical spring 18 surrounding the pin 4 and interposed between the slotted shank portion 17 and the head 4ª of said pin. Said truing bar at the intersection of the guide points 16 and shank 17 is deflected toward the caliper jaws as indicated at 15ª, Fig. 2, to bring said guide points in the same plane with the upper face of the caliper arms without interfering with its radial movement upon the pin 4. With such an arrangement the bar is adapted to slide with respect to the caliper jaws, and is also capable of angular or rotative movement whereby the bar may be used at either jaw end of the caliper and retained in any desired relative position by the spring 18.

A threaded pin 19 is secured to the inner face of the caliper jaw 2ª and projects inward in the same plane with the jaw, and is therefore beneath the indicator bar, this pin being designed as a vibrator by which the defective poise of wheels suspended between the caliper jaws is ascertained. To this end, the pin is roughened, the roughening being best secured by forming screw threads on the pin. Such vibratory movement at the jaw centers is set up by a pin or pointed instrument (not shown) drawn by the operator across the threaded pin 19 with sufficient violence to cause a series of very rapid vibrations in the instrument, thus causing a suspended wheel to turn if not perfectly poised and by such movement the defect is quickly and easily located. Feet or rests 20 located upon the jaws 2 and 2ª intermediate of the pivotal point of the arms and the pin 19, and secured to said jaws, serve to elevate one end of the caliper from the work bench during an enforced suspension of the examination of a wheel, and are particularly designed to hold the caliper in a position upon a bench best adapted to secure the proper vibration of the free ends of the caliper jaws when poising a wheel. The formation of the jaws 3 and 3ª which are substantially straight enables the operator to readily hold and manipulate the caliper, said arms constituting a handle by which the caliper may be held during the examination of a wheel to determine its trueness.

With the arrangement of the several parts as shown the operation is a follows: For example when it is desired to test a balance wheel of a watch, the screw 10 is adjusted so that the jewel bearings 14 will receive and firmly hold the wheel pivots and offer the least possible resistance when the wheel is revolved. The tension of the spring 8 is counteracted by the screw 10 and the delicately constructed wheel pivots are relieved of continued and varying degrees of pressure occasioned by the manipulation of the caliper in the hands of the operator. The balance wheel having been placed in position, the guide points of the indicator bar are moved close to the rim of the wheel and the wheel when revolved may be examined from either side of the caliper and the trueness of the wheel determined. The wheel is next caused to revolve and any lateral deviation in its circumference, or in its angular relation to the axis determined. These defects having been corrected the wheel is again placed in position in the caliper bearings for the purpose of determining the correctness of its poise or balance. In the last mentioned portion of the operation, the caliper is preferably placed upon a work bench or other convenient point of observation and rests upon the feet or rests in an elevated position without interference by other objects. As before stated, the jewel bearings of the jaws offer the least possible resistance to the wheel pivots so that an instrument of any character drawn across the threaded or roughened pin 19 will cause or set up sufficient vibratory motion at the jaw end to create or transmit an impulse to the wheel causing the heavy side to move downward by its own gravity.

As will be understood, a wheel, after adjustment to the jaws 2 and 2ª, may be removed and replaced any number of times without disarrangement of the caliper parts, the jaws 3 and 3ª acting as a handle which may be manipulated to open the jaws 2 and 2ª, said jaws being returned by the tension of the spring 8 to their adjusted positions.

The jaws 3 and 3ª are preferably used in the examination of the heavier wheels of a watch or clock, the indicator bar being turned upon the pin 10 to an operative position at that end of the caliper, and the operation in other respects is the same as before described.

Having thus described the invention what is claimed is:

1. A tool of the character described, comprising a pair of arms formed at their extremities with jaw members, a pivot pin securing the arms to each other intermediate the extremities of the arms, bearings secured to said jaws, an indicator bar longitudinally shiftable on the pivot pin, and means for adjusting and controlling the positions of the arms and jaws relatively to each other.

2. A tool of the character described, comprising a pair of arms formed at their extremities with jaw members, a pivot pin pivotally securing the arms to each other, an indicator bar provided with a guide point and having a longitudinal slot through which the pivot pin passes, and means for adjusting the arms and jaws relatively to each other.

3. A tool of the character described, comprising a pair of arms formed at their extremities with jaw members and pivotally secured to each other, and an indicator bar provided with opposed separated guide points, said bar being mounted on but longitudinally shiftable and adjustable with relation to said arms.

4. In a tool of the character described, a pair of arms formed at their extremities with jaw members and pivotally secured to each other, one of said arms being provided with a resilient pin distanced from said jaw member and projecting from the arm, said pin having a free end and being roughened on its face whereby minute vibrations may be communicated to the arms.

5. A tool of the character described, including a pair of arms formed at their extremities with jaw members and pivotally secured to each other, means for holding the arms adjusted nearer to or farther from each other, and a pin projecting inward from one of the said jaws and having a free end, said pin having a roughened face, whereby minute vibrations may be communicated to the arms.

6. A tool of the character described, comprising a pair of arms formed at their extremities with jaw members and pivotally secured to each other intermediate of the jaw extremities, a pivot pin connecting said jaw members, an indicator bar provided with guide points and longitudinally shiftable upon and rotatable about said pivot pin, means for holding the arms and indicator bar in their adjusted positions, and a pin projecting from one of said arms and extending inwardly toward the other of said arms and beneath the indicator bar, said pin being free at one end and having a roughened surface whereby minute vibrations may be communicated to the arms.

7. A tool of the character described, comprising a pair of arms, each arm formed at its opposite extremities with inwardly turned jaw members, each jaw member being provided with a caliper center, said arms being pivoted to each other intermediate of their length, said arms on one side of the pivot being longitudinally extended to form a handle whereby the jaws at the opposite ends of the arms may be operated, a U-shaped spring arranged between the longitudinally extended arms and acting to close the jaws at the opposite ends of the arms, said arms contacting with each other at their middle portions, and one of said arms being recessed transversely, and a screwthreaded stop extending transversely through a screwthreaded passage in one of said arms, said stop projecting at one end beyond the inner edge of the arm and adapted to engage with the edge of the opposed arm, the other end of the stop being provided with a head whereby the stop may be rotated.

8. A tool of the character described, including a pair of arms formed at their opposite extremities with jaw members, a pivot pin pivotally securing the arms together, adjustable heads on the pivot pin, an indicator bar having a slot through which said pivot pin passes, said indicator bar being supported on one side of said heads, and an annular spring surrounding the pivot pin and engaging at its margin with the indicator bar.

9. A tool of the character described, comprising a pair of arms formed at their extremities with opposed jaw members, a pivot pin securing the arms to each other intermediate their extremities, bearings secured in said jaws, and an indicator bar longitudinally shiftable on the pivot pin, said indicator bar being bifurcated at its extremity.

10. A tool of the character described, comprising a pair of arms, each of said arms being reversely curved at opposite ends, a pivot pin connecting the arms intermediate of their opposite ends, the arms thus forming two opposed pairs of jaws, one pair of jaws forming the handle for the opposite pair of jaws, an indicator bar longitudinally shiftable on the pivot pin, and means for adjusting and controlling the positions of the arms and jaws relatively to each other.

In testimony whereof I affix my signature in presence of two witnesses.

ELOF BENSON.

Witnesses:
E. H. OTTING,
J. H. HARVEY.